Figure 1:
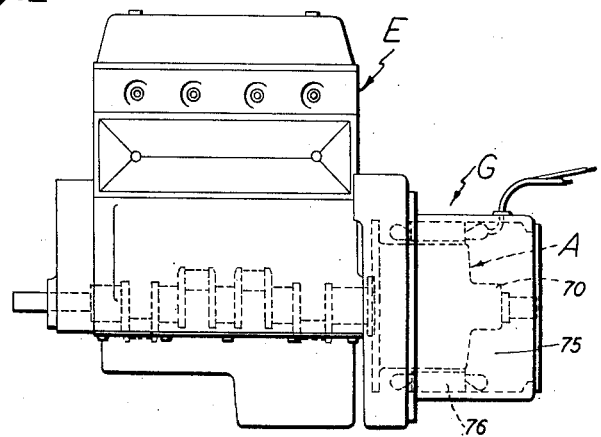

Sept. 10, 1957 M. W. BRAINARD 2,806,160
ROTOR, AND METHOD OF MAKING THE SAME
Filed Oct. 27, 1952 2 Sheets-Sheet 1

INVENTOR.
MAURICE W. BRAINARD
BY
Attorney.

Sept. 10, 1957 M. W. BRAINARD 2,806,160
ROTOR, AND METHOD OF MAKING THE SAME
Filed Oct. 27, 1952 2 Sheets-Sheet 2

INVENTOR.
MAURICE W. BRAINARD.
BY
Attorney.

United States Patent Office 2,806,160
Patented Sept. 10, 1957

2,806,160

ROTOR AND METHOD OF MAKING THE SAME

Maurice W. Brainard, Montebello, Calif., assignor of one-half to O'Keefe & Merritt Company, Los Angeles, Calif., a corporation of California Application October 27, 1952, Serial No. 317,107

6 Claims. (Cl. 310—156)

This invention has to do with a rotor or structure adapted to rotate as it is operated, and with a method of making such a structure, it being a general object of the invention to provide a simple, practical, rigid, rotor construction and a simple, dependable and practical method of making such a rotor.

The rotor which is the subject of the present invention is of the type wherein a plurality of separate or individually formed parts is assembled into a unit, which unit is intended or adapted to be rotated at such speed that pressures or strains develop tending to shift, or result in relative movement between, parts of the unit. In a typical, practical application of the invention, the rotor provided may be the rotating element of an electric machine such, for example, as the rotor of a generator, or the like. In view of this situation the structure hereinafter referred to specifically will be the rotor of an electric machine, and the parts incorporated in the rotor will include, essentially, a cage carrying permanent magnets. It is to be understood that as the broader principles of the invention are applied to other situations the parts may vary from those characteristic of an electric machine, and therefore the specific example hereinafter set forth is to be construed broadly, and not in a limited manner.

It is a general object of the present invention to provide a rotor characterized by a cage, a magnet in the cage, and an abutment engaged with the magnet and holding it tight in the cage.

It is another object of the invention to provide a rotor of the general character referred to wherein the magnet has wedging engagement with the rotor and is backed up by the abutment, so that the abutment positively maintains the magnet tightly wedged in the cage, and in contact therewith.

It is another object of the invention to provide a rotor of the general character referred to wherein the magnet is wedged between diametrically opposite pole parts of the rotor while a single abutment holds the magnet wedged with the pole parts.

It is a further object of this invention to provide a rotor of the general character referred to wherein the rotor includes a plurality of spaced magnets with a single abutment engaging the magnets and holding them in wedging engagement with the pole parts of the rotor.

It is another object of the present invention to provide a rotor of the general character referred to wherein the assembly formed by the cage, magnet, and abutment, is combined with a body characterized by end plates at opposite ends of the assembly and web parts that connect the end plates holding them tight on the assembly.

It is another object of the present invention to provide a rotor of the general character referred to wherein the body and the abutment are integrally joined, being preferably part of a single casting.

It is another object of the present invention to provide a method of making a rotor of the general character referred to wherein simple, easily executed steps of assembly are combined with thermal treatment to the end that the parts that are easily and rapidly assembled are finally incorporated in the rotor to form a solid or rigid unitary structure wherein the component parts are not subject to shifting or relative movement, even under severe operating conditions.

The rotor which is the subject of this invention preferably includes one or more magnets, preferably permanent magnets, in a cage that includes diametrically opposite polar parts, frame elements extending between the polar parts and tie members connecting the polar parts and the frame elements. The assembly of the cage and magnets considered broadly is completed by an abutment engaged with the magnet or magnets to positively and solidly hold them in working position relative to the cage, and particularly with reference to the polar parts of the cage. In the preferred construction the polar parts of the cage present inclined seats or wedge parts and the ends of the magnets engage the polar seats and are wedged tightly into engagement with them. In a preferred arrangement a plurality of magnets, as for instance two magnets, is provided. The magnets extend parallel with each other between diametrically opposite polar parts, and are spaced apart, or from one another, so that a single abutment between the magnets and extending diametrically of the rotor holds the magnets in wedging engagement with the seats of the polar parts. In a preferred form of the invention the magnets are sectional in form and sections of the magnets are arranged between spaced frame elements of the cage and the polar parts are of laminated construction and extend circumferentially of the rotor, so that each polar part cooperates with a plurality of magnets. More specifically, the invention provides a body in connection with the assembly of magnets, cage, and abutment, and in a typical case the body is made up of end plates that occur at opposite ends of the assembly, and wedges related to and coupling the end plates so that they are in fixed relation to each other and relative to the assembly. The end plates of the rotor present elements of the structure that facilitate application of the rotor to or its incorporation in a machine such as a generator, or the like.

Figure 2:
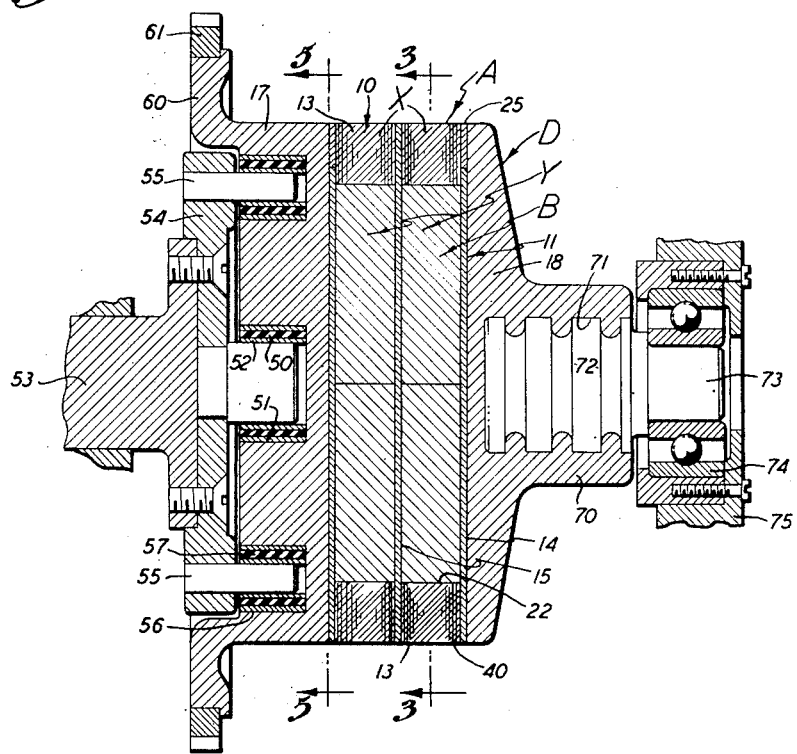
Figure 4:
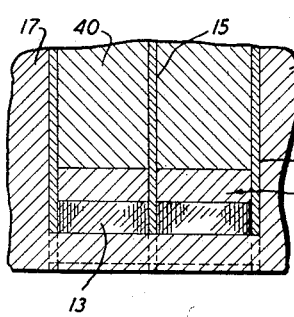
Figure 3:
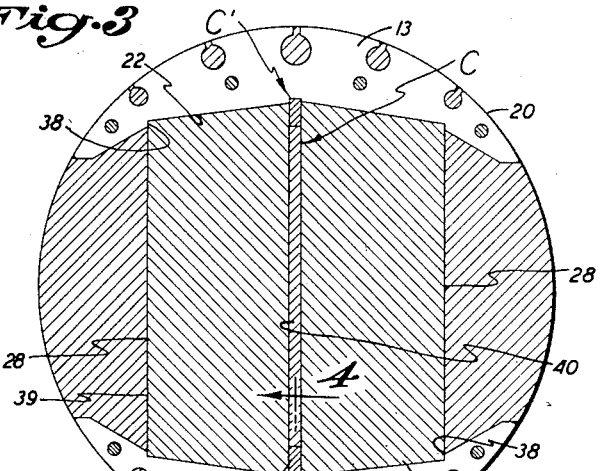
Figure 5:
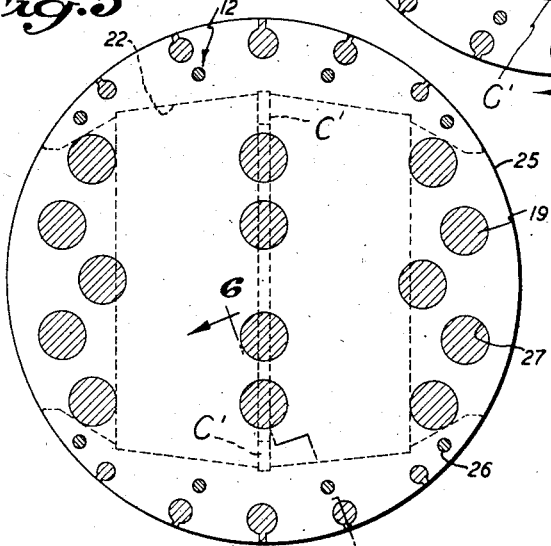
Figure 6:
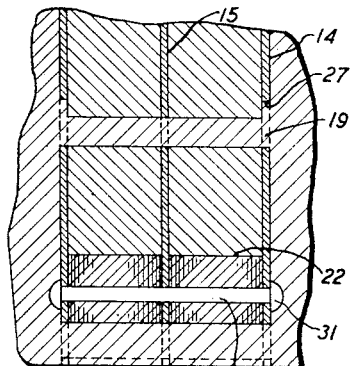

The various objects and features of my invention will be fully understood from the following detailed description of a typical preferred form of the invention and a typical manner of carrying out the method, throughout which description reference is made to the accompanying drawings, in which:

Fig. 1 is a side elevation of a prime mover, in the form of an internal combustion engine, coupled to and driving a generator, the rotor of which embodies the present invention. Fig. 2 is a longitudinal, central, sectional view of the rotor and certain of the parts of the structure shown in Fig. 1. Fig. 3 is a detailed transverse sectional view of the rotor being a view taken as indicated by line 3—3 on Fig. 2. Fig. 4 is an enlarged detailed, sectional view of a portion of the rotor, being a view taken substantially as indicated by line 4—4 on Fig. 3. Fig. 5 is a detailed, transverse, sectional view of the rotor, being a view taken as indicated by line 5—5 on Fig. 2. Fig. 6 is an enlarged detailed sectional view of a portion of the rotor, being a view taken substantially as indicated by line 6—6 on Fig. 5, and Figs. 7 to 11, inclusive, are somewhat diagrammatic views illustrating steps performed in carrying out the method of the present invention and illustrating in particular the manner in which the magnets are assembled with the cage, one after another, or are wedged into the cage and then made tight by an abutment engaged between the magnets.

The present invention is concerned, generally, with a rotor construction, and it is concerned with a method of making such a rotor construction. It is believed that the method as provided by the invention will be understood and immediately apparent from a consideration of the structure and the following description of the handling of the structure.

The rotor which is the subject of the present invention may, in accordance with the broader principles of the invention, be varied widely in form and construction and for purpose of example it is disclosed and referred to as the rotor of an electric machine, such as a generator G, and that electric machine is shown coupled to and adapted to be driven by a prime mover in the form of an engine E. The rotor considered broadly includes a cage A, one or more magnets B located in and engaged with the cage A, and one or more abutments C related to or engaged with the magnets holding them tight, preferably in wedging engagement with parts of the cage. More specifically, and as disclosed in the drawings, the rotor includes a body D combined with or supporting the assembly formed of the cage A, magnets B and abutments C.

The cage in the preferred form of the present invention is characterized by pole pieces or polar parts 10, frame elements 11 extending between the polar parts, and tie members 12 connecting the frame elements and polar parts. In the particular adaptation of the invention herein set forth there are two polar parts, and these are located diametrically opposite each other, and there are several frame elements between which sections 13 of the polar parts occur or are confined. In the particular case illustrated there are end frame elements 14 and an intermediate frame element 15. The several frame elements are preferably alike and they are disc-shaped parts concentric with the major central axis of the rotor. The tie members 12 extend axially of the rotor through the frame elements and the polar parts and tie these elements together. Further, in the particular rotor illustrated there are like magnets B each made up of sections occurring between frame elements of the cage. The sections of the two magnets are engaged by abutments C so that each abutment engages and holds at least two magnet sections. The body D considered generally is characterized by end plates 17 and 18 and has web portions 19 extending axially of the rotor and between the end plates to hold the end plates tight on the assembly formed by the cage, magnets and abutments.

The polar parts 13 of cage A are preferably alike and in the case illustrated they are diametrically opposite each other, that is, they are at diametrically opposite sides of the rotor. Each polar part 13 has an outer periphery 20 curved concentric with the axis of the rotor and each polar part is sectional, that is, it has portions or sections occurring between the frame elements as clearly illustrated in Fig. 2 of the drawings. In the preferred construction the polar parts 13 are of laminated construction, that is, they are made up of a plurality of superimposed plates, which plates are of magnetic material, say, for example, iron or soft steel. Each section of each polar part is of such extent circumferentially of the rotor as to present inwardly facing seats 22 that are engaged by corresponding ends of magnet sections that are between the frame elements of the cage and located in opposite directions from the central axis of the rotor in a direction normal to that in which the polar parts are disposed or spaced apart relative to the central axis of the rotor.

The frame elements 11 of the cage are preferably flat disc-shaped plate-like parts and in a preferred form of the invention they are formed of sheet material that is non-magnetic, for instance they may be formed of stainless steel or other comparable non-magnetic material.

The frame elements 11 are disposed in planes normal to the longitudinal axis of the rotor and extend between the polar parts 13. At the polar parts 13 the frame elements enter between the sections of the polar parts, as clearly illustrated in Fig. 2 of the drawings.

In practice the number of frame elements employed in the rotor may vary widely, depending upon the size or complexity of the rotor. To illustrate the general construction contemplated by the invention, a rotor is illustrated having end frame members 14 occurring at the ends of the frame and an intermediate frame member 15 located between the end elements. In this case each polar part is divided into two sections X and each magnet B is divided into two sections Y. It is to be understood that if additional intermediate frame elements 15 are employed, the polar parts and magnets may be accordingly divided into more sections than illustrated.

In the preferred construction each frame element has an outer edge or peripheral portion 25 curved to be concentric with the axis of the rotor and it has a plurality of openings 26 that pass the tie members 12 and a plurality of parts 27 that pass the web parts of the body D. In the case of the parts 27 that pass the web parts of the body, there may be a wide variation as to factors such as size, shape and location. In the drawings openings 27 of different sizes are illustrated and some are located in the peripheral portions of the frame elements and open at the periphery of the rotor, while others are located inward of the periphery 25. In the particular case illustrated certain of the openings 27 are located outward of or from the outer sides 28 of the magnet sections Y while others are located in a line or series extending diametrically of the rotor and parallel with the magnet sections to occur opposite or in register with the abutments C located between the magnet sections.

The tie members 12 may in practice vary widely in number, size and arrangement. In the case illustrated the tie members 12 are confined to the portion of the cage A where the polar parts 13 occur and each tie member includes a rod 30 extending axially through the assembly of polar part sections X and frame elements 11 while heads 31 on the ends of the rod 30 outward of the end frame members secure the parts assembled as clearly illustrated in Fig. 6 of the drawings.

The magnet sections Y are elongate in form and the two sections of the two magnets occurring between adjacent frame elements are arranged parallel with each other and extend between the polar parts 13 of the cage and are spaced in opposite directions from the central axis of the rotor. Through this construction the sections of the magnets are parallel and spaced apart and their ends 36 oppose and are engaged with the seats 22 provided in the polar parts 13 of the cage.

In accordance with the present invention the magnets or magnet sections and the polar parts of the cage are related so that there is wedging engagement between these parts. In the preferred form of the invention the magnet sections wedge between opposed parts or seats 22 of the polar parts. In the construction illustrated the magnet sections Y wedge radially outward between opposed portions of the polar parts and when two magnets are employed, as illustrated in the drawings, the magnets wedge outwardly in opposite directions relative to the center of the rotor. In the case illustrated the seats 22 at the inner sides of the two polar parts 13 accommodating opposite ends 36 of a magnet section Y are pitched or inclined relative to each other to be outwardly convergent, that is, convergent in a direction in which the magnet section is removed from the central axis of the rotor.

Figure 7:
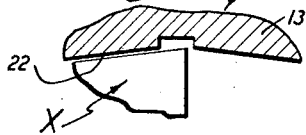
Figure 8:
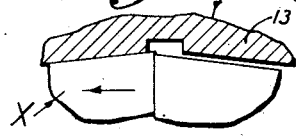
Figure 9:
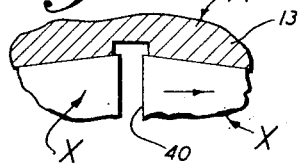
Figure 10:
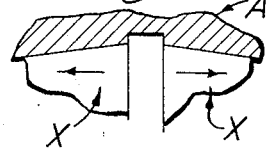
Figure 11:
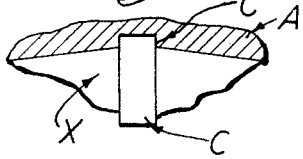

In the preferred construction the seats 22 of the polar parts are flat and smooth and extend outward to and terminate at inwardly facing shoulders 38 at the inner sides of the polar parts 13. The ends 36 of the magnet sections are likewise preferably flat and smooth and are inclined or pitched to correspond to the inclination or pitch of the seats 22. The parts just referred to are related and proportioned so that when the magnet sections are in their outermost positions, or are fully and tightly engaged in the cage, having wedging engagement with the polar parts of the cage, the outer sides 28 of the magnet sections at the ends of the magnet are seated against the shoulders 38. This relationship of parts is clearly illustrated in Fig. 3 of the drawings. It is to be observed that the construction is such that there is a substantial space between the inner sides 40 of opposite sections X of the magnets B making possible quick, simple, insertion of the magnet sections as the construction is assembled. Fig. 7 illustrates the manner in which a first magnet section is accommodated freely in the cage, or relative to the polar parts of the cage to then be moved out into contact with the seats 22, as illustrated in Fig. 8, whereupon the second magnet section can be inserted, as shown in Fig. 8, to be thereafter moved out into seated engagement as shown in Fig. 9. Following mere contact or seating as shown in Fig. 9, the opposite sections X of the magnets may be forced apart or outward and into tight wedged seating engagement with the seats 22, as shown in Fig. 10, and when the magnet sections are in this wedged or stopped position, abutments C' in the form of bars or the like may be inserted between the magnet sections, as shown in Fig. 11, to assure correct spacing of the magnets when casting.

Where the construction is such that the polar parts of the cage and the magnets are sectional, as illustrated in the drawings, there is preferably an abutment C employed between each set or pair of opposite magnet sections, as shown throughout the drawings. The abutments C are preferably solid rigid elements or metal parts, engaged with or contacting the inner sides 40 of the magnet sections and they are preferably coextensive with the inner sides of the magnet sections.

The body D is preferably a unitary member. For instance, in practice, it can be advantageously formed as a casting and in the preferred form of the invention the abutments employed in the rotor are integral with the body or are parts of the casting that forms the body.

In the particular case illustrated the body has two end plates 17 and 18 which are parts of the rotor which can, in practice, be varied widely in form and construction to accommodate other parts or mechanisms or to facilitate mounting of the rotor in a machine or in combination with a structure such as the engine E. In the particular case illustrated the end plate 17 is a disc-shaped part corresponding in size and shape with the cage A. The plate 17 has a central bearing part in the form of a bushing or insert 50 carried in a central socket 51 provided in the outer side of the plate. The insert 50 is shown accommodating a trunnion 52 projecting from the end of the engine shaft 53. In the particular case illustrated a drive is shown provided between the engine shaft and the end plate 17, which drive includes a flange 54 fixed on the engine shaft and having drive pins 55 projecting axially from it and engaged in bushings or inserts 56 carried in sockets 57 provided in the outer side of the end plate 17. In the case illustrated the trunnion 52 engaged in the end plate, as clearly shown in Fig. 2, centers the rotor relative to the engine shaft and the drive means referred to provides a couple between the engine shaft and the rotor whereby these parts turn or rotate together. In the particular case illustrated a wheel or flange 60 is provided on the end plate 17 and carries a ring gear 61 which may be an element of a starting mechanism or a drive for other parts.

The other or outer end plate 18 is shown as a simple, disc-like part corresponding in size and shape with the cage A, and it has an outwardly projecting boss 70 provided with a socket 71 accommodating a shaft member 72 which has a projecting end portion 73. The projecting end portion 73 of shaft 72 is shown carried in an antifriction bearing 74 supported in a case 75 attached to the engine E. In the case illustrated the case 75 not only houses the rotor provided by the present invention, but also an electrical element 76 which surrounds the motor and cooperates therewith.

The web parts 19 of the body D extend between and connect or join the end plates 17 and 18 and they form parts which fill or occupy what might otherwise be spaces or voids occurring in the assembly made up of the cage, magnets, and abutments. In the case illustrated the webs or web parts 19 fill the spaces between the frame elements not otherwise occupied, and they extend through the openings 27 in the frame elements, all as clearly illustrated throughout the drawings. As has been suggested above, it is preferred that the abutments C occurring between opposed magnets or magnet sections be part of or integral with the body. In the preferred construction the body including the end plates 17 and 18 and the web parts 19 is formed as a casting, and the abutments are likewise formed as castings and as part of the body casting.

In accordance with the present invention a tight or solid assembly of parts is gained not only by means of the general construction hereinabove described, but by a particular relationship of materials and a method of making the rotor employing the parts that have been described. In accordance with the present invention the frame elements of the cage are formed of a material, preferably a metal, having a coefficient of expansion greater than the metal employed in the formation of the magnets but not necessarily greater than the metal employed in the formation of the body. In practice the magnets may be formed of an alloy or magnetic material such as is commonly known as Alnico V, being an alloy of iron, aluminum, nickel, cobalt, and copper, whereas the body D is a casting made of aluminum alloy. The frame elements 14 and 15 in this case may be advantageously formed of stainless steel, which material has a greater coefficient of expansion than the material employed in the magnets but less than the body.

In accordance with the method provided by the present invention the cage A is assembled and in the course of that operation the magnet sections X are inserted between the opposed sets of the polar parts 13 in a manner such as is illustrated in Figs. 7, 8 and 9 of the drawings. In accordance with the invention heat is applied to the parts or to the assembly, with the result that the frame elements of the cage expand, separating the opposed faces 22 of the polar parts, making possible ready spreading or expansion of the magnet sections X from a position such as is indicated in Fig. 9 to the position shown in Fig. 10 where the magnet sections abut the shoulders 38. With the structure thus assembled, and preferably while it is still hot, the body D is formed or cast, in the course of which operation the abutments C are likewise and simultaneously cast, with the result that the entire unit is hot and the abutments are established between the opposed magnet sections. As the assembly thus established is cooled or allowed to cool to a normal or room temperature, there is some shrinkage of the magnet sections and the abutments, but there is greater shrinkage of the frame elements of the cage, with the result that the frame elements of the cage draw the opposed polar parts 13 toward each other and tight against the ends of the magnet sections. As a result of the method provided by the present invention the finished rotor has stresses or strains established in it maintaining the magnet sections clamped tight between the opposed parts of the cage, and as a result of this the rotor can be safely operated at high speeds without any danger of parts working loose or moving relative to each other. It will be recognized from the drawings, and particularly from Fig. 2, that in the course of casting the body the shaft 72, which may be of a material suitable for support of the rotor, may be cast in or with the end 18 of the body. It is to be understood, of course, that in practice suitable dressing or finishing operations may be performed on the assembly after the casting of the body and the cooling of the assembly.

It will be noted that in carrying out the method described, the wedging action of the magnets and pole pieces will insure a tight fit therebetween when heated for casting, so that aluminum cannot cast between the parts to form an undesirable air gap and yet are loose enough when cold to permit assembly.

Having described only a typical preferred form and a typical manner of carrying out the method of my invention, I do not wish to be limited or restricted to the specific details hereinabove set forth, but wish to reserve to myself any variations or modifications that may appear to those skilled in the art and fall within the scope of the following claims.

Having described my invention, I claim:

1. The method of making a rotor having a cage with opposed seats and a thermally expansible frame connecting the seats, a magnet between the seats, an abutment holding the magnet, and a body including, applying heat to the frame and while it is expanded applying the magnet tight against the seats and engaging the abutment with the magnet by casting the body with the abutment as a part thereof and engaged with the magnet.

2. A rotor including a cage having diametrically opposed peripheral portions with opposed seats converging toward each other radially of the rotor, an elongate magnet extending between the peripheral portions and having its opposite end poles engaged with the seats, and an abutment engaging the magnet intermediate the seats and holding it wedged outwardly between the seats, the peripheral portions having shoulders stopping outward movement of the magnets when they are in full wedging engagement with the seats.

3. A rotor including, a cage having a plurality of axially spaced, transversely disposed frame elements of non-magnetic material with openings through them, diametrically opposite polar parts of magnetic material between the frame elements and at the periphery of the rotor, each polar part having two inwardly facing seats, and tie members connecting the frame elements and polar parts together as a unit, two like elongate magnets at opposite sides of the center of the rotor and extending from one polar part to the other and each having its opposite end poles bearing outwardly and in wedging engagement with opposed seats of the polar parts, an abutment of non-magnetic material between the magnets holding them apart and in pressure engagement with the seats, and a body having end plates at the ends of the cage and webs extending between and connecting the end plates and being engaged through the openings, the body being a unitary casting and the abutment being integral with the body.

4. The method of making a rotor comprising the steps of forming each of a pair of pole pieces with facing convergent seat portions, assembling said pole pieces into diametrically opposed relationship to form a cage, seating a pair of magnets on said seat portions, heating the cage and magnets to permit said magnets to move away from each other in a radial direction while maintaining said magnets in contact with said seat portions, and casting said cage and magnets into a body including an integral abutment extending between said magnets.

5. The method of making a rotor comprising the steps of assembling a frame to provide opposed pairs of inwardly divergent seats, seating a magnet upon each pair of said seats, applying heat to said frame, maintaining the magnets in seating engagement with said seats, and fixing said magnets with respect to said frame, while said frame is heated, by casting a unitary body thereabout, said body including an integral abutment portion extending between adjacent magnets.

6. A rotor comprising a pair of diametrically opposed pole pieces each having a seat portion, the seat portion of one pole piece facing the seat portion of the other pole piece, each of said seat portions including a symmetrical pair of inwardly facing inclined convergent surfaces, a pair of magnets each having oppositely inclined end surfaces complementary to and seated upon an opposed pair of said convergent surfaces, and means maintaining said magnets and pole pieces in assembled relationship including a pair of axially spaced end plates and an abutment integral with said end plates extending axially of said rotor between said magnets.

References Cited in the file of this patent

UNITED STATES PATENTS

| 198,707 | Taylor | Dec. 25, 1877 |
| 1,827,323 | Louis | Oct. 13, 1931 |
| 2,299,589 | Reis | Oct. 20, 1942 |
| 2,475,776 | Brainard | July 12, 1949 |
| 2,485,474 | Brainard | Oct. 18, 1949 |
| 2,493,102 | Brainard | Jan. 3, 1950 |

FOREIGN PATENTS

| 198,725 | Great Britain | June 4, 1923 |
| 478,149 | Great Britain | Jan. 13, 1938 |
| 668,436 | Germany | Dec. 3, 1938 |
| 786,004 | France | May 27, 1935 |
| 970,524 | France | June 21, 1950 |